(No Model.) 2 Sheets—Sheet 1.

L. P. HULIN.
PROCESS OF TREATING ALLOYS FOR MANUFACTURING ELECTRODES.

No. 587,829. Patented Aug. 10, 1897.

(No Model.) 2 Sheets—Sheet 2.
L. P. HULIN.
PROCESS OF TREATING ALLOYS FOR MANUFACTURING ELECTRODES.
No. 587,829. Patented Aug. 10, 1897.
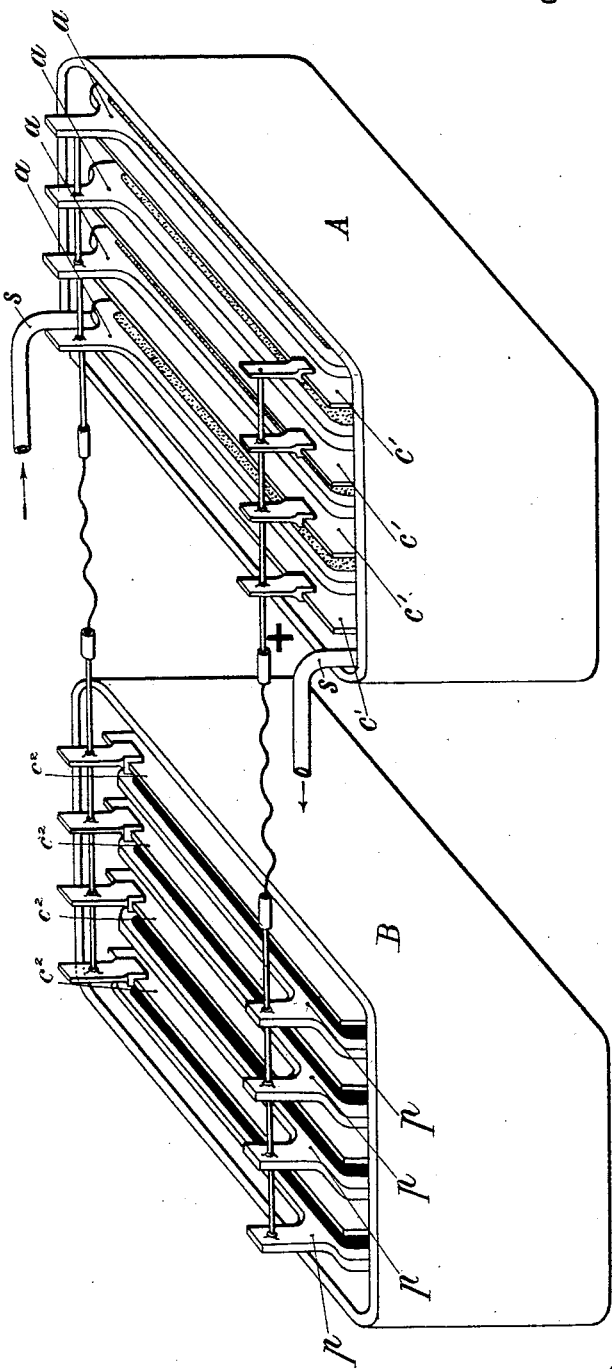

UNITED STATES PATENT OFFICE.

LÉON PAUL HULIN, OF MODANE, FRANCE.

PROCESS OF TREATING ALLOYS FOR MANUFACTURING ELECTRODES.

SPECIFICATION forming part of Letters Patent No. 587,829, dated August 10, 1897.

Application filed December 21, 1894. Serial No. 532,600. (No specimens.) Patented in France May 7, 1894, No. 238,336; in Belgium May 7, 1894, No. 109,807, and in Germany June 10, 1896, No. 86,459.

*To all whom it may concern:*

Be it known that I, LÉON PAUL HULIN, of the city of Modane, Savoy, France, have invented a Process for the Treatment of Certain Metallic Alloys for the Manufacture of Elements for Voltaic Batteries and Caustic Alkalies or Their Derivatives, (for which I have obtained Letters Patent in France for fifteen years, dated May 7, 1894, No. 238,336; in Belgium for fifteen years, dated May 7, 1894, No. 109,807, and in Germany, No. 86,459, dated June 10, 1896,) of which the following is a full, clear, and exact description.

My invention relates to a process of treating certain metallic alloys whereby to conjointly produce electrodes for primary or for secondary batteries or for use in electrolytic operations, and also caustic alkalies or their derivatives.

As regards electrodes my invention consists in a process of producing in cells or upon a rigid support an essentially spongy or porous metal, forming the active material, by transforming a heavy compact metal, such as lead, copper, &c., into a highly porous condition, yet still possessing the necessary strength and cohesion to enable it to resist destructive influences and to adhere to its support.

The alkalies and their derivatives are the immediate and direct result of rendering the metal above referred to porous by my process, the production of the alkali accompanying that of the active material, the alkaline derivatives resulting from the special means adopted for preventing the disintegration of the active material, an electric current being also obtained which is used to peroxidize the porous metal of the electrodes to be used at the positive pole of secondary batteries. Three separate results are thus obtained at once, viz: First, spongy metal in the form of a finished electrode is produced; second, caustic alkali and alkaline derivatives are produced; third, an electric current is generated which may be utilized for "forming" peroxidized electrodes.

In order that the invention may be more readily understood, I will take as an example of the practice of my process the manufacture of electrodes for accumulators of spongy lead and peroxid of lead, the active material being contained in a supporting and conductive grid of hard lead.

Reference is to be had to the accompanying drawings, wherein—

Figure 1:
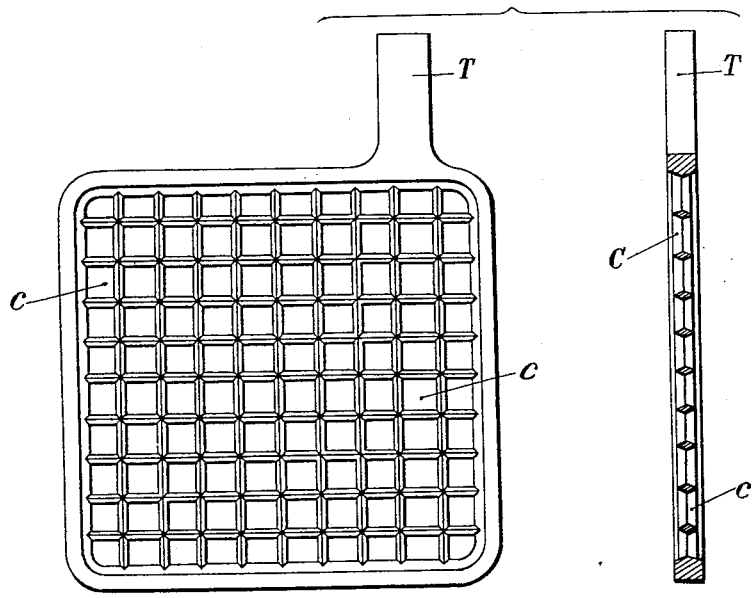
Figure 2:
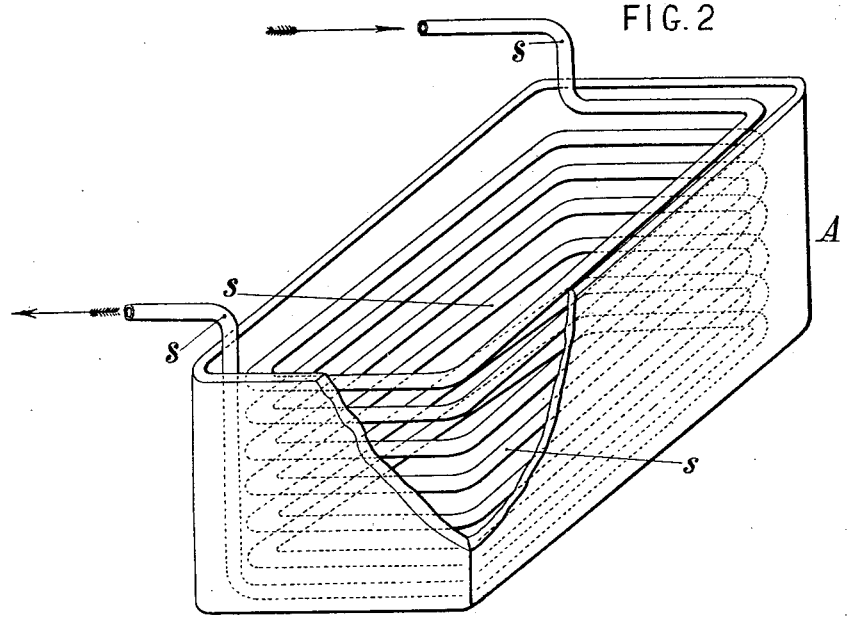

Figure 1 represents in side view and in section a supporting-grid C of hard lead, having cells or cavities c to contain the active material and a conducting-tang T. Fig. 2 represents a cooling arrangement for the tank in which the reaction is effected. Fig. 3 represents the electrolytic arrangement for peroxidizing the electrodes.

In this process all the electrodes are first prepared of spongy lead, after which some are converted into lead peroxid, as will be hereinafter explained.

In order to produce porous lead capable of practically storing a large quantity of electric energy and of resisting destructive influences, I first prepare by electrolysis an alloy of lead and an alkaline or alkali earth metal, such as sodium, potassium, strontium, barium, &c., as described in my patent dated the 2d day of July, 1895, No. 542,057. In order that sufficient porosity may be obtained, this alloy should contain at least fifteen per cent. by weight of alkaline or alkali earth metal. The greater the proportion of alkaline or alkali earth metal the greater will be the porosity of the active material, and in practice I usually employ twenty per cent. and upward of alkaline or alkali earth metal. The employment of an alkaline alloy of this richness and its mode of treatment form the basis of the process constituting the present invention. I first fuse this alloy by heat, and after having placed the grid, Fig. 1, between two cast-iron plates, forming a mold, the alkaline alloy is run in around the grid of hard lead, (which is much less fusible,) so as to fill all the cells, and when sufficiently cooled I remove from the mold the grid filled with the solidified alloy, which presents the appearance of a smooth solid plate. The alloy adheres well to the hard-lead support, to which it becomes almost welded, thereby insuring the permanent adhesion of the active material and a perfect electric contact with the conducting-grid.

To obtain at the same time both spongy lead and alkali, I immerse the molded plate in water, which becomes decomposed by an alloy so rich in alkali metal, the latter becoming oxidized and transformed into caustic alkaline or alkali earth, which is dissolved, the lead remaining adherent to the grid and in the spongy metallic state, by reason of the elimination of the alkali metal. When the operation is complete, the plate is removed, washed, and dried.

The production of agglomerated and coherent porous lead by eliminating the alkali metal by plain water is effected by using an alkaline or alkali earth metal other than potassium and sodium—viz., barium, which metal has never to my knowledge been used for making electrodes. The barium may be eliminated from alloys of lead with fifteen per cent. to eighteen per cent. of barium by water alone. The use of barium is therefore an important improvement, as it enables me to obtain spongy metal free from the disintegration which would be caused by the same proportion of sodium or potassium, although the use of a larger proportion of barium in the alloy, with a view to a high degree of porosity, would necessitate the use of an oxygen-yielding compound, as in the case of the other alkali metals, to moderate the evolution of hydrogen, but with the advantage that the barium eliminated, which has passed into the liquid and become mixed with other compounds, may be separated as an insoluble salt of baryta. The use of metallic barium as a constituent part of the alloys is therefore an essential feature, as by its elimination are obtained, first, an electrode of heavy spongy metal having the requisite physical cohesion, and, second, an insoluble product which is readily separable from the compounds with which it is mixed.

In order to further moderate the activity of the reaction of the alkaline or alkali earth metal upon the liquid in which the plates of alloy are immersed, any suitable system of refrigeration may be employed for cooling the liquid—e.g., a circulation of cold water around the tanks or through a worm $s\ s$ in tank A, Fig. 2. The chemical reaction by which the alkaline or alkali earth metal is eliminated from the alloy generates an electric current in the plates, the intensity of which is augmented by the recombination of the hydrogen liberated with the oxygen-yielding compound dissolved in the water. This current is used to peroxidize some of the spongy-metal electrodes, and thus "form" the positive plates for secondary batteries. For this purpose the molded and cooled plates $a$ of alloy are placed in a tank A, Fig. 3, alternately with carbon, lead, or copper plates $c'$ of the same size, similar plates being connected in parallel, and in another tank B are placed electrodes $p\ p$ of spongy lead, from which the alkaline or alkali earth metal was eliminated at a previous operation, alternately with carbon plates $c^2\ c^2$. The plates are electrically connected, the group of alloy plates in A with the group of carbon plates in B and, reciprocally, the group of carbon plates $c'$ in A with the spongy plates $p\ p$ in B to be peroxidized. The liquid in A may consist of nitrate-of-soda solution and that in B of dilute sulfuric acid. The oxidation of the alkali metal of plates $a$ generates an electric current with evolution of oxygen at plates $p\ p$, whereby the spongy lead is peroxidized. The tank A should be kept cool by a worm $s$. Thus both spongy and peroxidized electrodes are obtained at the same time.

The process described with regard to lead plates is equally applicable to the preparation of spongy electrodes of other metals—such, for instance, as copper, silver, &c.—particularly electrodes of porous copper for use in accumulators having for an electrolyte a solution of oxid of zinc in caustic alkali, (zincate of soda or potash.) These porous-copper electrodes may be oxidized either by hot air or by electrolysis to form plates of agglomerated oxid of copper for use in primary batteries with zinc and caustic potash. The process also enables blocks of perfectly agglomerated and coherent porous metal in various forms to be made for other purposes, such as for filters or chemical or other apparatus in which porous metal in an agglomerated form is used or for filtering-electrodes used in electrolytic decompositions for separating the liquid or filterable ions. The alloy treated may contain more than one metal to be rendered porous or to be eliminated.

What I claim, and desire to secure by Letters Patent, is—

1. The herein-described process of producing electrodes of spongy metal which consists in alloying a heavy metal such as lead with barium, and thereupon treating the alloy with a liquid to eliminate the barium and thereby produce a spongy-metal electrode.

2. The herein-described process for the manufacture of electrodes of porous metal, which consists in alloying a heavy metal to be rendered porous, and a metal easily oxidized by water, thereupon casting the said alloy upon a metallic grid, whereby the said alloy will remove the oxid which may be on the grid and fuse thereto, and thereupon treating the cast mass with a liquid which will oxidize the oxidizable metal, leaving the other metal porous and firmly adherent to the grid.

3. The herein-described process for the manufacture of electrodes which consists in alloying a heavy metal and an easily-oxidizable metal, in thereupon casting the said alloy upon a support which is less fusible than the said alloy and to which the said alloy will adhere, and thereupon treating the cast mass with a liquid which will oxidize the oxidizable metal, leaving the other metal porous and firmly adherent to the support.

The foregoing specification of my process for the treatment of certain metallic alloys for the manufacture of elements for voltaic batteries and caustic alkalies or their derivatives signed by me this 3d day of December, 1894.

LÉON PAUL HULIN.

Witnesses:
CLYDE SHROPSHIRE,
ALBERT MOREAU.